Jan. 8, 1952 G. E. DATH 2,581,520
FRICTION SHOCK ABSORBER FOR RAILWAY CAR TRUCK SPRINGS
Filed July 30, 1948
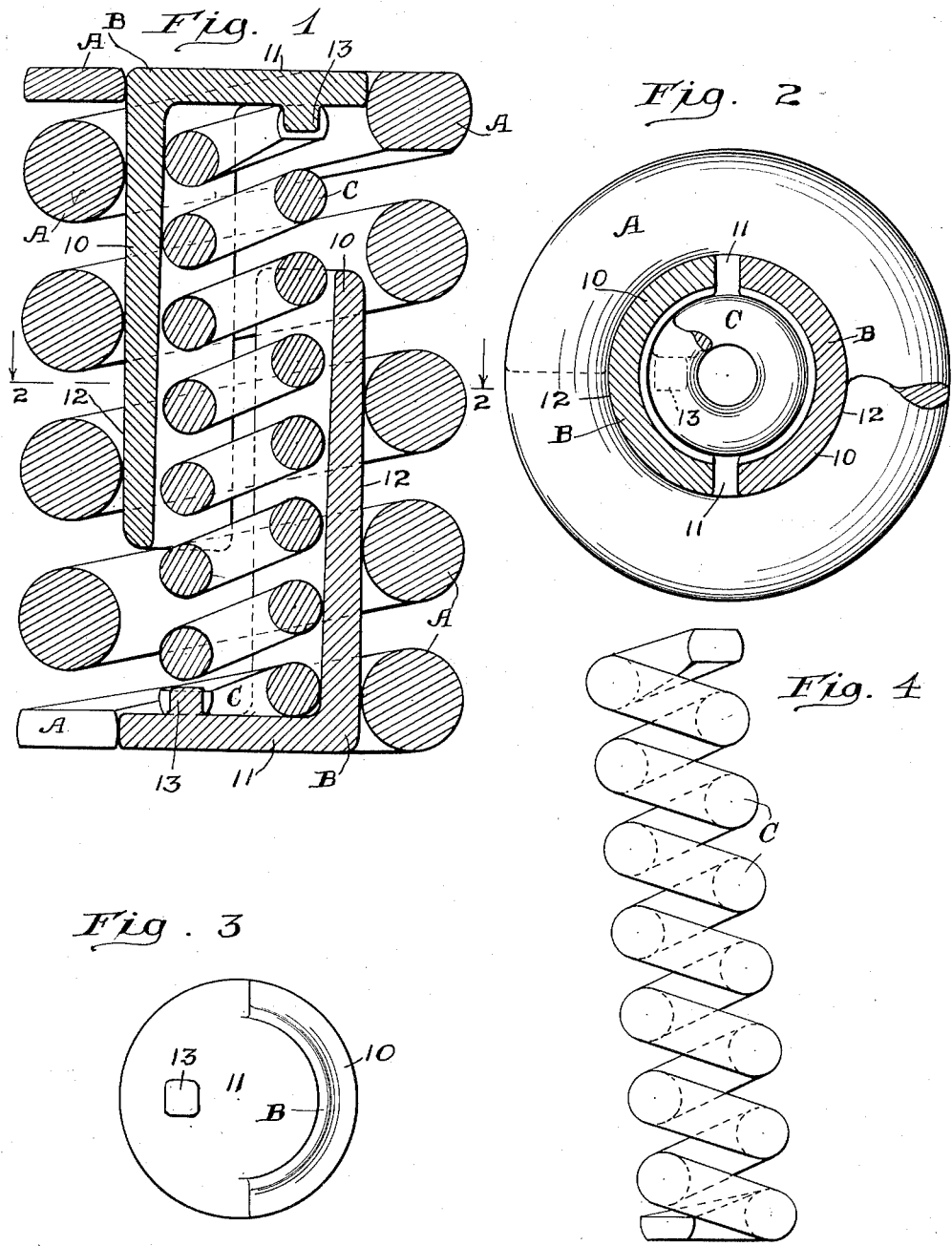
Inventor
George E. Dath.
By
Henry Fuchs
Atty.

Patented Jan. 8, 1952

2,581,520

UNITED STATES PATENT OFFICE 2,581,520

FRICTION SHOCK ABSORBER FOR RAILWAY CAR TRUCK SPRINGS

George E. Dath, Mokena, Ill., assignor to W. H. Miner, Inc., Chicago, Ill., a corporation of Delaware Application July 30, 1948, Serial No. 41,606

2 Claims. (Cl. 267—9)

This invention relates to improvements in friction shock absorbers for snubbing the action of railway car truck springs.

One object of the invention is to provide a friction shock absorber comprising an outer coil spring member, a pair of relatively lengthwise movable friction elements having sliding frictional engagement with the inner sides of the coils of the spring, and an inner coil spring enclosed by the friction elements and opposing relative lengthwise movement of the same toward each other, wherein the inner spring also serves to spread the friction elements apart into tight frictional contact with the outer coil spring.

Other objects of the invention will more clearly appear from the description and claims hereinafter following.

In the accompanying drawing forming a part of this specification, Figure 1 is a transverse vertical sectional view of the improved friction shock absorber. Figure 2 is a horizontal sectional view, corresponding substantially to the line 2—2 of Figure 1. Figure 3 is a top plan view of the lower friction element of the mechanism shown in Figure 1. Figure 4 is a side elevational view of the inner coil spring employed in the improved mechanism, showing the same as it is provided before application to the other parts of the device.

My improved friction shock absorber, as illustrated in the drawing, comprises broadly an outer coil spring A, a pair of lengthwise movable friction elements B—B, and an inner coil spring C.

The outer spring A is in the form of a helical coil and corresponds to the outer coil spring employed in one of the spring units of a truck spring cluster of a railway car, comprising the usual inner and outer coil springs.

The friction elements B—B are of similar design, each element comprising a semi-cylindrical plate 10, having a disclike base portion 11 at its outer end, forming a follower member. As shown most clearly in Figure 1, the elements B—B are reversely arranged end for end at the top and bottom of the mechanism and are telescoped within the spring A, the top element having the disclike base 11 at its upper end, with the friction plate 10 depending therefrom, and the bottom element having the disclike base 11 at its lower end, with the plate 10 upstanding therefrom. The plates 10—10 are disposed at diametrically opposite sides of the mechanism and present transversely curved, longitudinally extending friction surfaces 12—12 on their outer sides in slding frictional engagement with the inner sides of the coils of the outer spring A.

As will be evident, the outer spring thus functions in the manner of a friction shell with which the elements B—B have sliding frictional engagement.

The inner coil spring C, which is in the form of a helical coil, is arranged lengthwise between the plates 10—10 of the friction elements B—B and has its top and bottom ends bearing on the disclike base portions 11—11 of said elements. The outer side of the coil at the upper end of the spring C bears on the inner side of the plate 10 of the top friction element B, and the outer side of the coil at the lower end of said spring bears on the inner side of the plate 10 of the bottom friction element B. The spring C is under canting tension in the assembled condition of the mechanism to spread the elements B—B apart and forcibly press the friction surfaces 12—12 thereof into engagement with the interior of the spring A. The spring C, as manufactured and before assembly with the other parts of the device, has the axis about which it is coiled inclined with respect to the vertical axis of the base of the spring, as shown in Figure 4. In other words, the spring is formed so that it leans to one side when stood on its base, and tends to return to its leaning or inclined position when forcibly righted by flexing the same to the upright position shown in Figure 1. As will be evident, the spring C is thus under canting tension in the assembled condition of the mechanism, exerting pressure toward the left at its upper end on the inner side of the plate 10 of the top friction element B, which plate is at the left hand side of the mechanism, and exerting pressure toward the right at its lower end on the inner side of the plate 10 of the bottom friction element B, which plate is at the right hand side of the mechanism. To prevent rotary displacement of the spring C, each element B is provided with a stop lug 13 with which the outer end of the tang at the corresponding end of the spring engages. The lug 13 of each element B is in the form of a projection on the inner side of the disclike base 11 of the same and is located diametrically opposite to the plate 10 of said element. As shown in Figure 1, the end of the tang at the lower end of the spring C is engaged in back of the lug 13 of the bottom friction element B and the end of the tang at the upper end of said spring is engaged in back of the lug 13 of the top friction element B.

My improved shock absorber preferably either replaces one or more of the spring units of a truck spring cluster, being interposed between the usual top and bottom spring follower plates, which cooperate with said cluster, or the unit comprising the friction plates and the inner coil spring of my improved mechanism may replace the inner coil of one or more of the units of the cluster, the same being inserted within the usual outer spring which corresponds to the spring A of the improved mechanism as disclosed.

The operation of the improved friction shock absorber is as follows: Upon the spring cluster of the truck of a railway car being compressed between the spring follower plates of the cluster, my improved shock absorber, which is disposed between said follower plates, is compressed therewith, thereby compressing the outer spring A and forcing the top friction element B downwardly toward the bottom friction element B, against the resistance of the spring C. Due to the canting tension of the spring C, the friction plates 10—10 of the elements B—B are pressed into tight frictional contact with the inner sides of the coils of the spring A, thus providing the required frictional resistance during relative movement of the elements B—B to snub the action of the truck springs. Compression of the mechanism is positively limited by engagement of the outer end of the plate 10 of each element B with the disclike base 11 of the other element, the parts being properly proportioned to accomplish this result. Upon recoil of the truck springs, the parts of the shock absorber are restored to the normal position shown in Figure 1, the spring A recoiling, and the expansive action of the spring C moving the friction elements B—B lengthwise apart.

I claim:

1. In a friction shock absorber, the combination with a lengthwise disposed outer coil spring; of a pair of relatively lengthwise movable friction elements at opposite ends of the device having sliding frictional engagement with the interior of said outer coil spring; and a lengthwise extending inner coil spring between said friction elements, having shouldered engagement at opposite ends with said elements to oppose lengthwise movement thereof toward each other, said inner coil spring being under tension in canting direction, one side of said inner coil spring at one end thereof bearing on the inner side of one of said elements, and the opposite side of said inner coil spring at the other end thereof bearing on the inner side of the other element to spread said elements apart into tight frictional contact with the inner sides of the coils of said outer spring.

2. In a friction shock absorber, the combination with a lengthwise disposed outer coil spring; of a top friction element having a depending friction plate slidingly telescoped within said outer coil spring, said plate having a follower at the upper end thereof; a bottom friction element having an upstanding friction plate slidingly telescoped within said outer coil spring, said last named plate having a follower at the lower end thereof; said plates of said elements being at diametrically opposite sides of the mechanism in sliding engagement with the inner sides of the coils of said outer spring; a lengthwise extending inner coil spring between said plates of said elements having its top and bottom ends bearing on said followers of said top and bottom elements; one side of said inner coil spring at the top portion thereof bearing on the inner side of the plate of said top element, and the opposite side of said last named spring at the bottom portion thereof bearing on the inner side of the plate of said bottom element, said inner coil spring being under tension in canting direction to spread said elements apart and press the same against the inner sides of the coils of said outer spring in the fully expanded condition of the mechanism.

GEORGE E. DATH.

REFERENCES CITED

The following references are of record in the file of this patent:

UNITED STATES PATENTS

| Number | Name | Date |
| --- | --- | --- |
| 1,215,214 | O'Connor | Feb. 5, 1918 |
| 2,141,522 | Duryea | Dec. 27, 1938 |
| 2,388,229 | Light | Oct. 30, 1945 |
| 2,410,165 | Johnson et al. | Oct. 29, 1946 |
| 2,470,172 | Leese | May 17, 1949 |